UNITED STATES PATENT OFFICE.

BENNO HOMOLKA, OF HÖCHST-ON-THE-MAIN, GERMANY, ASSIGNOR TO THE FARBWERKE, VORMALS MEISTER, LUCIUS & BRÜNING, OF SAME PLACE.

BLUE DYE.

SPECIFICATION forming part of Letters Patent No. 418,916, dated January 7, 1890.

Application filed May 4, 1889. Serial No. 309,600. (No specimens.)

*To all whom it may concern:*

Be it known that I, BENNO HOMOLKA, doctor of philosophy, a citizen of the Empire of Austria, residing at Höchst-on-the-Main, in the Empire of Germany, have invented certain new and useful Improvements in Coloring-Matter of the Induline Series; and I do hereby declare the following to be a full, clear, and exact description of the invention, such as will enable others skilled in the art to which it appertains to make and use the same.

My invention relates to the production of a blue-violet coloring-matter not known heretofore, the hydrochloride of which is easily soluble in hot water and has the composition $C_{24}H_{18}N_4HCl$. This coloring-matter is obtained by heating under certain conditions a mixture of aniline, hydrochlorides of aniline, and amidoazo-benzole. Along with this coloring-matter are formed in the induline melt a number of other indulines, the hydrochlorides of which are insoluble in water. Of all the coloring-matters in the induline melt the coloring-matter in question is the only one capable of forming a stable acetate. It can therefore quite easily be isolated from the accompanying coloring-matters in the following manner: The mixture of the hydrochlorides of indulines is treated with diluted sodium-lye for twelve to twenty-four hours. The induline bases thus obtained are collected on a filter and washed carefully with cold water. Now the mixture of the bases in a still wet state is suspended in one hundred to one hundred and fifty parts of water, acetic acid added, and the whole boiled. The new induline, ($C_{24}H_{18}N_4$,) which alone dissolves, is filtered hot and the filtrate concentrated to about one-fourth of its volume. The acetate of the induline $C_{24}H_{18}N_4$ crystallizes in small blue leaves with brown luster. It is collected on a filter, pressed, and dried at 80° centigrade. The acetate thus obtained is easily soluble in cold water and forms a coloring-matter most suitable for dyeing and printing purposes.

Instead of the acetic acid, other organic acids—such as tartaric acid, citric acid, and laevulic acid—may be used with equally good results.

What I claim as my invention, and wish to secure by Letters Patent, is—

As a new article of manufacture, the blue-violet coloring-matter described, formed from aniline, hydrochlorides of aniline, and amido-azo-benzole, having the formula $C_{24}H_{18}N_4$, capable of forming stable acetate, the acetate of said coloring-matter crystallizing in small blue leaves with brown luster and is easily soluble in cold water, and the hydrochloride of the coloring-matter is easily soluble in hot water, and is expressed by the formula $C_{24}H_{18}N_4HCl$.

In testimony whereof I affix my signature in presence of two witnesses.

BENNO HOMOLKA.

Witnesses:
JOSEPH REVERDY,
HEINRICH HAHN.